US008526766B2

(12) United States Patent  
Poor (10) Patent No.: US 8,526,766 B2  
(45) Date of Patent: Sep. 3, 2013

(54) USE OF COMPOSITE BITMAPPED IMAGES IN CONJUNCTION WITH DISPLAY OF CAPTURED DATA

(75) Inventor: David D. S. Poor, Meadowbrook, PA (US)

(73) Assignee: CTB/McGraw-Hill LLC, Monterey, CA (US)

( * ) Notice: Subject to any disclaimer, the term of this patent is extended or adjusted under 35 U.S.C. 154(b) by 1707 days.

(21) Appl. No.: 11/931,067

(22) Filed: Oct. 31, 2007

(65) Prior Publication Data

US 2009/0110270 A1    Apr. 30, 2009

(51) Int. Cl.  
G06K 9/54 (2006.01)  
G09G 5/00 (2006.01)  
G05B 19/18 (2006.01)

(52) U.S. Cl.  
USPC ................................. 382/302; 345/619; 700/2

(58) Field of Classification Search  
None  
See application file for complete search history.

(56) References Cited

U.S. PATENT DOCUMENTS

| | | | |
|---|---|---|---|
| 4,300,123 A | 11/1981 | McMillin et al. | |
| 4,428,733 A * | 1/1984 | Kumar-Misir | 434/363 |
| 4,478,584 A | 10/1984 | Kaney | |
| 4,708,503 A | 11/1987 | Poor | |
| 4,760,464 A | 7/1988 | Sakano | |
| 4,857,715 A | 8/1989 | Koch et al. | |
| 4,937,439 A | 6/1990 | Wanninger et al. | |
| 4,978,305 A | 12/1990 | Kraft | |
| 5,001,330 A | 3/1991 | Koch | |
| 5,001,769 A | 3/1991 | Reid-Green et al. | |
| 5,004,896 A | 4/1991 | Serrell et al. | |
| 5,011,413 A | 4/1991 | Ferris et al. | |
| 5,085,587 A | 2/1992 | DesForges et al. | |
| 5,099,340 A | 3/1992 | Kamada et al. | |
| 5,103,490 A | 4/1992 | McMillin | |
| 5,134,669 A | 7/1992 | Keogh et al. | |
| 5,140,139 A | 8/1992 | Shepard | |
| 5,184,003 A | 2/1993 | McMillin et al. | |
| 5,194,966 A | 3/1993 | Quardt et al. | |
| 5,211,564 A | 5/1993 | Martinez et al. | |
| 5,218,530 A * | 6/1993 | Jastrzebski et al. | 382/207 |
| 5,291,592 A * | 3/1994 | Kita | 382/306 |
| 5,318,465 A | 6/1994 | Boyle et al. | |
| 5,371,673 A | 12/1994 | Fan | |
| 5,420,407 A | 5/1995 | Grundy | |
| 5,434,931 A | 7/1995 | Quardt et al. | |
| 5,452,379 A | 9/1995 | Poor | |

(Continued)

FOREIGN PATENT DOCUMENTS

WO    WO 02-15170 A2    2/2002  
WO    WO 02-15558 A2    2/2002

OTHER PUBLICATIONS

Adobe Photoshop 7.0 Help, "Locking Layers", Mar. 2002.*

(Continued)

*Primary Examiner* — Randolph I Chu  
(74) *Attorney, Agent, or Firm* — Rothwell, Figg, Ernst & Manbeck, P.C.

(57) ABSTRACT

In order to efficiently present data extracted from a captured image of an assessment document, a single bitmapped composite image is constructed from multiple images or components such that each layer or content type is stored within discrete bits within each pixel. Different layers are then shown, hidden, emphasized, or otherwise manipulated within a display process through the use of palette color manipulation. Applications to other than assessment documents are discussed.

15 Claims, 11 Drawing Sheets

(56) References Cited

U.S. PATENT DOCUMENTS

| | | | |
|---|---|---|---|
| 5,664,076 A | 9/1997 | Pluta et al. | |
| 5,672,060 A | 9/1997 | Poor | |
| 5,711,673 A | 1/1998 | Grundy | |
| 5,869,789 A | 2/1999 | Reid-Green | |
| 5,873,077 A * | 2/1999 | Kanoh et al. | 1/1 |
| 5,991,595 A | 11/1999 | Romano et al. | |
| 6,002,794 A * | 12/1999 | Bonneau et al. | 382/166 |
| 6,079,624 A | 6/2000 | Apperson et al. | |
| 6,166,716 A * | 12/2000 | Kashino | 726/19 |
| 6,173,154 B1 | 1/2001 | Kucinski et al. | |
| 6,176,429 B1 | 1/2001 | Reddersen et al. | |
| 6,256,399 B1 | 7/2001 | Poor | |
| 6,282,314 B1 * | 8/2001 | Sugiura et al. | 382/173 |
| 6,289,125 B1 | 9/2001 | Katoh et al. | |
| 6,295,439 B1 | 9/2001 | Bejar et al. | |
| 6,311,040 B1 | 10/2001 | Kucinski et al. | |
| 6,335,805 B1 | 1/2002 | Ishiguro et al. | |
| 6,366,760 B1 | 4/2002 | Kucinski et al. | |
| 6,459,509 B1 | 10/2002 | Maciey et al. | |
| 6,466,683 B1 | 10/2002 | Poor | |
| 6,470,100 B2 * | 10/2002 | Horiuchi | 382/295 |
| 6,526,258 B2 | 2/2003 | Bejar et al. | |
| 6,532,077 B1 | 3/2003 | Arakawa | |
| 6,552,829 B1 | 4/2003 | Maciey et al. | |
| 6,556,210 B1 * | 4/2003 | Yamamoto et al. | 345/582 |
| 6,558,166 B1 | 5/2003 | Clark et al. | |
| 6,684,052 B2 | 1/2004 | Kucinski et al. | |
| 6,704,467 B2 * | 3/2004 | Uchida | 382/311 |
| 6,961,482 B2 | 11/2005 | Knowles | |
| 6,988,895 B1 | 1/2006 | Lamarche et al. | |
| 7,020,435 B2 | 3/2006 | Moulthrop et al. | |
| 7,054,464 B2 | 5/2006 | Poor | |
| 7,095,979 B2 | 8/2006 | Stout | |
| 7,123,764 B2 | 10/2006 | Kirk et al. | |
| 2001/0046314 A1 * | 11/2001 | Neri et al. | 382/135 |
| 2002/0110798 A1 | 8/2002 | Kucinski et al. | |
| 2002/0122606 A1 | 9/2002 | Knowles | |
| 2003/0086586 A1 | 5/2003 | Poor | |
| 2004/0021720 A1 * | 2/2004 | Abello | 347/15 |
| 2004/0086841 A1 | 5/2004 | Clark et al. | |
| 2004/0121298 A1 | 6/2004 | Creamer et al. | |
| 2004/0126036 A1 | 7/2004 | Poor | |
| 2004/0131279 A1 | 7/2004 | Poor | |
| 2004/0150840 A1 * | 8/2004 | Farrell et al. | 358/1.1 |
| 2004/0185424 A1 | 9/2004 | Kucinski et al. | |
| 2004/0259067 A1 | 12/2004 | Cody et al. | |
| 2006/0115178 A1 * | 6/2006 | Fan et al. | 382/275 |
| 2006/0120605 A1 | 6/2006 | Poor | |
| 2006/0187477 A1 * | 8/2006 | Maki et al. | 358/1.9 |
| 2007/0008564 A1 | 1/2007 | Friedman et al. | |
| 2007/0230810 A1 * | 10/2007 | Kanatsu | 382/243 |
| 2007/0273917 A1 * | 11/2007 | Encrenaz et al. | 358/1.15 |
| 2008/0042427 A1 * | 2/2008 | Muke | 283/112 |
| 2009/0067750 A1 * | 3/2009 | Pryszo et al. | 382/294 |

OTHER PUBLICATIONS

International Search Report for WO 2002-15558-A3, assigned to CTB/McGrawhill LLC, 3 pages. (Aug. 29, 2002).

International Search Report for WO 2002-15170-A3, assigned to CTB/McGrawhill LLC, 3 pages. (Apr. 25, 2002).

* cited by examiner

*Figure 5a: Component Images*

*Figure 5b: Composite Image Pixels*

| COMPOSITE IMAGE CONTENTS | | | | | | COMPOSITE IMAGE DISPLAY COLORS | | | |
|---|---|---|---|---|---|---|---|---|---|
| | | | | | | PALETTE COLORS | | | VISIBLE LAYERS |
| | COMPOSITE IMAGE PIXEL CONTENTS | | | | | Set 1 | Set 2 | Set 3 | |
| | Bit 3 | Bit 2 | Bit 1 | Bit 0 | Pixel | Yes | Yes | Yes | Response |
| COMPONENT LAYERS | Unused | Hint | Template | Response | | No | Yes | Yes | Template |
| | | | | | | No | No | Yes | Hint |
| Background | 0 | 0 | 0 | 0 | 0 | White | White | White | |
| Constructed response only | 0 | 0 | 0 | 1 | 1 | Black | Black | Black | |
| Template only | 0 | 0 | 1 | 0 | 2 | White | Blue | Blue | |
| Hint only | 0 | 1 | 0 | 0 | 4 | White | White | Red | |
| Response and Template | 0 | 0 | 1 | 1 | 3 | Black | Black | Black | |
| Hint and Response | 0 | 1 | 0 | 1 | 5 | Black | Black | Red | |
| All three layers | 0 | 1 | 1 | 1 | 7 | Black | Black | Red | |

| COMPOSITE IMAGE CREATION AND DISPLAY | | | | | | | | | |
|---|---|---|---|---|---|---|---|---|---|
| Composite Image Mapping 610 | | | | | | | | | |
| Component Layer | Rubric | Mask | Hint | Template | Student Response | | | | Background |
| Composite Image Pixel Bit(s) | Bit 7 | Bit 6 | Bit 5 | Bit 4 | Bit 3 | Bit 2 | Bit 1 | Bit 0 | n/a |
| Component layer bit | 1 bit | 1 bit | 1 bit | 1 bit | high order 4 bits | | | | |
| Layer Control Parameters 620 | | | | | | | | | |
| Layer Precedence | 5 | 4 | 3 | 1 | 2 | | | | n/a |
| Exclusive | yes | no | no | no | no | | | | n/a |
| Default | off | on | off | on | on | | | | n/a |
| Toggle | yes | no | yes | yes | no | | | | n/a |
| Layer Color Assignments 630 | | | | | | | | | |
| Normal | Magenta | Navy | Red | Lt Blue | Black to gray | | | | White |
| Cream | Magenta | Navy | Maroon | Blue | Dark blue to light blue | | | | Cream |
| Reversed | Magenta | Yellow | Red | Gold | White to gray | | | | Black |
| High Contrast | Magenta | Black | Purple | Maroon | Various colors | | | | White |

Figure 7

*Figure 7a: Contrast Manipulation Controls*

*Figure 7b: Color display values for constructed response layer*

| Contrast | Values for 4 pixel bits | | | | | | | | | | | | | | | 730 |
|---|---|---|---|---|---|---|---|---|---|---|---|---|---|---|---|---|
| Setting | 1 | 2 | 3 | 4 | 5 | 6 | 7 | 8 | 9 | 10 | 11 | 12 | 13 | 14 | 15 |
| 1 Lightest | 255 | 255 | 255 | 255 | 255 | 255 | 255 | 255 | 255 | 255 | 255 | 255 | 255 | 255 | 0 |
| 2 | 245 | 238 | 232 | 225 | 219 | 212 | 206 | 199 | 192 | 189 | 186 | 182 | 174 | 167 | 0 |
| 3 | 238 | 227 | 216 | 205 | 194 | 183 | 173 | 162 | 151 | 146 | 139 | 133 | 121 | 108 | 0 |
| 4 | 235 | 222 | 209 | 195 | 182 | 169 | 156 | 143 | 130 | 124 | 116 | 109 | 94 | 79 | 0 |
| 5 Normal | 228 | 211 | 193 | 176 | 158 | 141 | 123 | 106 | 88 | 80 | 70 | 60 | 40 | 20 | 0 |
| 6 | 163 | 150 | 138 | 125 | 113 | 100 | 88 | 75 | 63 | 57 | 50 | 43 | 29 | 14 | 0 |
| 7 | 98 | 90 | 83 | 75 | 68 | 60 | 53 | 45 | 38 | 34 | 30 | 26 | 17 | 9 | 0 |
| 8 | 33 | 30 | 28 | 25 | 23 | 20 | 18 | 15 | 13 | 11 | 10 | 9 | 6 | 3 | 0 |
| 9 Darkest | 0 | 0 | 0 | 0 | 0 | 0 | 0 | 0 | 0 | 0 | 0 | 0 | 0 | 0 | 0 |

Figure 8

*Figure 8a: Component imaghes*

*Figure 8b: Composite image display*

USE OF COMPOSITE BITMAPPED IMAGES IN CONJUNCTION WITH DISPLAY OF CAPTURED DATA

FIELD OF THE INVENTION

The invention relates to the efficient storage and presentation of data extracted from a captured image of a document.

BACKGROUND

In the field of assessment, many assessments include so-called "constructed response" (CR) items in which the respondent creates his or her response through text, drawings, hand-written numbers, formulas, or other creation. Depending on the task required by the CR item, text responses may be as little as a single punctuation mark. For verbal responses, the task may be as little as a single word or may require a longer response such as a phrase, list, sentence, paragraph, or even an essay. Non-verbal responses may include numbers, proofs, drawings, graphs, lines, etc.

While CR item responses used to be scored by having readers view the responses in an assessment booklet, most CR item responses are scored by having the reader view a digitized image of the student response are described, for example, in Poor, U.S. Pat. No. 5,672,060 (Poor '060), the disclosure of which is hereby incorporated by reference. In this process, the assessment document is first scanned using an optical scanner which captures a digitized image of a portion of the sheet(s) on which the response was created such that the portion includes at least the area containing the response. Subsequently, when it is time to assign a score to the response, a human reader views the captured digital image on a computer monitor and assigns the score based on an evaluation of the displayed image.

The current invention teaches the use of a novel image storage such that a reader can easily distinguish between student marks and pre-printed content. The invention further provides processes whereby specified areas can be hidden or masked, or processes whereby a reader can superimpose a hint to assist with scoring. In fact, the invention provides processes whereby any finite number of "layers" of content can be selectively presented to the reader.

BRIEF SUMMARY OF THE INVENTION

This invention is targeted specifically to instances in which scoring of a constructed response is based on a digitized representation of a student response to a constructed response item. Typically, the digitized representation is displayed on a computer screen so that a human reader can score the item.

For many constructed response items, in order to be able to assign a score, the reader must be presented with not only the student response, but also the pre-printed instructions and other pre-printed marks on the document on which the student relied in creating the constructed response. As an example, if the task is to trace the outline of a drawing, the reader must see both the pre-printed drawing and the respondent's marks in order to determine the extent to which the respondent accurately traced the outline.

Typically, the digitized representation is created by scanning a paper assessment document, although digitized representations can come from other sources, such as digital pens, touch screens, digitizing pads, tablet PC's. In most instances, the digitized representation includes only the student response and does not include the context in which the response was made, such as pre-preprinted instructions and other pre-printed marks on the document.

In the context of paper-based assessments that are scanned by image scanners, there are two techniques that are typically used to isolate the student response from other visible markings on the document.

The first method uses assessment documents printed with two types of ink. The first type of ink consists of so-called "drop-out inks" which are special inks that do not absorb infrared. Typically all test content, instructions, and marks to show the respondent the appropriate area or areas into which to make responses are printed with drop-out ink. The second type of ink typically contains carbon within the ink and does absorb infrared light. Such inks are typically used to create marks used by the scanning system to identify the document and to ensure proper data capture from the document. With this method, documents are scanned by systems employing a light source in the infra-red spectrum. When scanned, the captured images show carbon inks, pencil marks, toner, and other marks that absorb infra-red light, but the captured images do not show content or marks printed in drop-out inks.

With the second method, documents are scanned by systems employing light in the visual spectrum, and a full color image is typically captured. Possibly through hardware, but more typically through software, instances of one or more specific colors are removed from the image to leave only marks made by the respondent in areas designed for student responses.

If a digitized representation of a student response is shown without any context, it is often difficult or impossible to assign an appropriate score. On the other hand, if the context and the student response are shown in the same color (typically black), it will be difficult to distinguish between the student response and the pre-printed information so that it may, again, be difficult to score the item. This invention shows a method to merge both the student response and the pre-printed context within a single "composite" image by treating each as a separate "layer" within the image. The invention then shows a corresponding method to display the image so that the reader can distinguish between the pre-printed information and the student response as well as selectively display each or both without altering the underlying image.

In the context of scoring of constructed responses, additional "layers" of information may be included into a single composite image. Such additional layers may include so-called rubrics which contain the scoring rules, "hints" which contain quick guides for scoring such as the correct answer, or "masks" which may be required to ensure non-biased scoring by redacting areas that might indicate or imply metadata about the student, the classroom, the school, the school district, or other extraneous data unrelated to the item and response.

While developed to facilitate more productive scoring of constructed response items for large scale assessments, this invention may be advantageously used within a wide variety of other applications.

Compared to alternative approaches, such as keeping a full color image of the scanned page, the current invention has significant advantages for both infrastructure and performance. Because all other layers are typically "fixed", i.e. the same for all instances of the same item, only the image with just the student response need be maintained for each response. Because these images contain just the digitized representation of the student response, the image files will be significantly smaller than files that contain more information, thereby reducing the requirements for disk space and bandwidth such as needed to get the images to the reader workstation. Typically, the composite image for a specific response will be created on the reader workstation before the reader is ready to view the item. In creating the composite image, each layer is assigned one or more specific "bits" within the composite image pixels so that existing, efficient, bitmap display procedures can be used to display the composite image. By adjusting the colors used to display the various pixels within the composite image, the user can selectively display different layers and perform other manipulations of the displayed image without making any alteration to the underlying image.

DETAILED DESCRIPTION

Figure 1A:
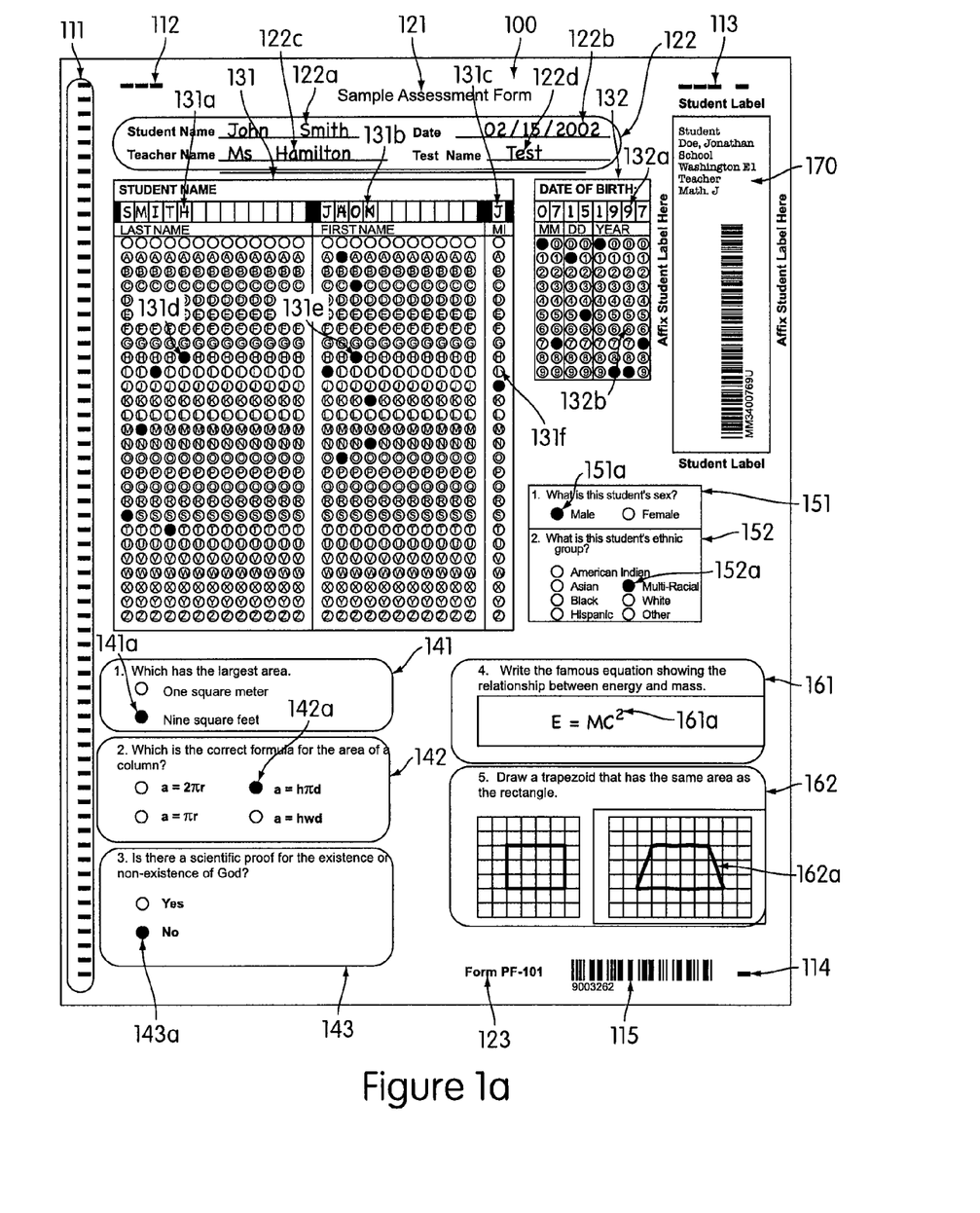
FIG. 1a shows a page of an assessment document with one or more student responses.

FIG. 1a shows a page of an assessment document (100) with a plurality of pre-printed materials including marks specifically to ensure proper scanning and identification (111-115), text to identify the form and the respondent (121-123), text and response areas for demographic data including name (131) and date of birth (132), text and item response areas for selected responses (141-143), text and response areas for survey-like questions (151-152), and text and response areas for two constructed response items (161-162).

FIG. 1a further shows student responses including handwritten identifying information (122a-122d), both handwritten characters (131a-131c and 132a) and completed OMR response targets (131d-131f and 132b) for the demographic fields, responses to the selected response items (141a-143b), responses to the survey questions (151a and 152a) and constructed responses to the two constructed response items (161a and 162a).

Within FIG. 1a there is additionally a student barcode label (170).

Figure 1B:
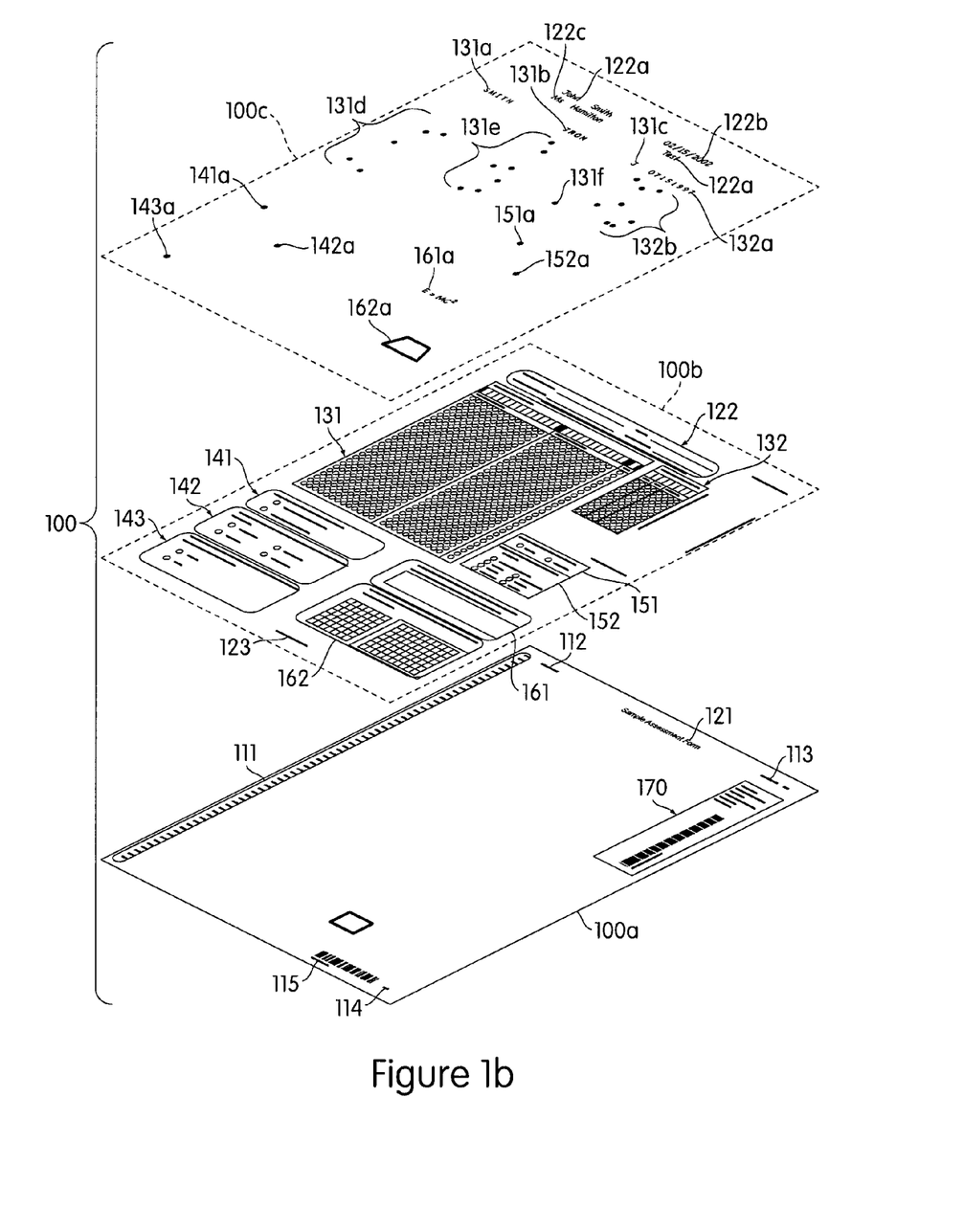
FIG. 1b shows the assessment document of FIG. 1a separated into three layers of data, including a student response layer and two layers of preprinted text and graphics.

FIG. 1b shows the assessment document 100 separated into three layers of data, including a first layer 100a of pre-printed text and graphics, a second layer 100b of additional pre-printed text and graphics, and a third layer 100c of student-made response marks. In the composite assessment document 100, the different layers may be in different colors to help distinguish the data presented in the different layers. For example, the pre-printed text in layer 100a may be shown in blue or black ink, the pre-printed text in layer 100b may be shown in red ink, and the response marks in layer 100c may be shown in black or dark gray (as in pencil marks).

Figure 2:
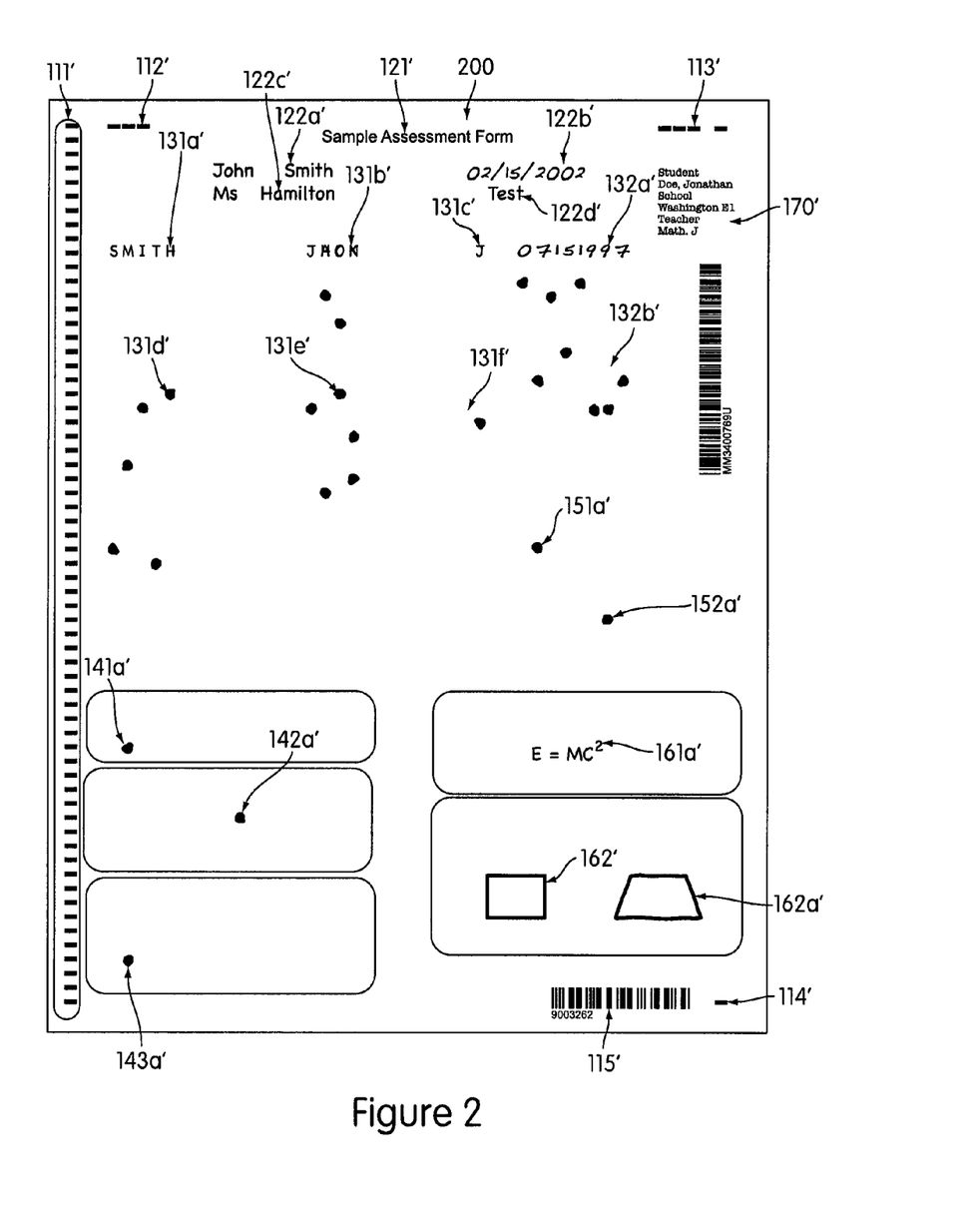
FIG. 2 shows a digitized representation of the student responses on the page.

FIG. 2 shows a captured scanned image (200) of the page of an assessment document shown in FIG. 1. Within the pre-printed information, using carbon ink, and student responses are captured, while pre-printed information using drop-out ink (or a drop-out color), that is, the data in layers 100a and 100b of FIG. 1b, is not. Within the image, the captured images corresponding to the components in FIG. 1 are shown with like numbers.

The plurality of pre-printed marks (111'-115') included ensure proper scanning and identification and appear in the captured image along with the text pre-printed in carbon ink (121'). Within the second constructed response, the portion preprinted in carbon ink is also captured (162'). All of the student responses are captured including handwritten identifying information (122a'-122d'), both handwritten characters (131a'-131c' and 132a') and completed OMR response targets (131d'-131f' and 132b') for the demographic fields, responses to the selected response items (141a'-143b'), responses to the survey questions (151a' and 152a'), and constructed responses to the two constructed response items (161a' and 162a'). The printed information from the student barcode is also captured (170').

Figure 3:
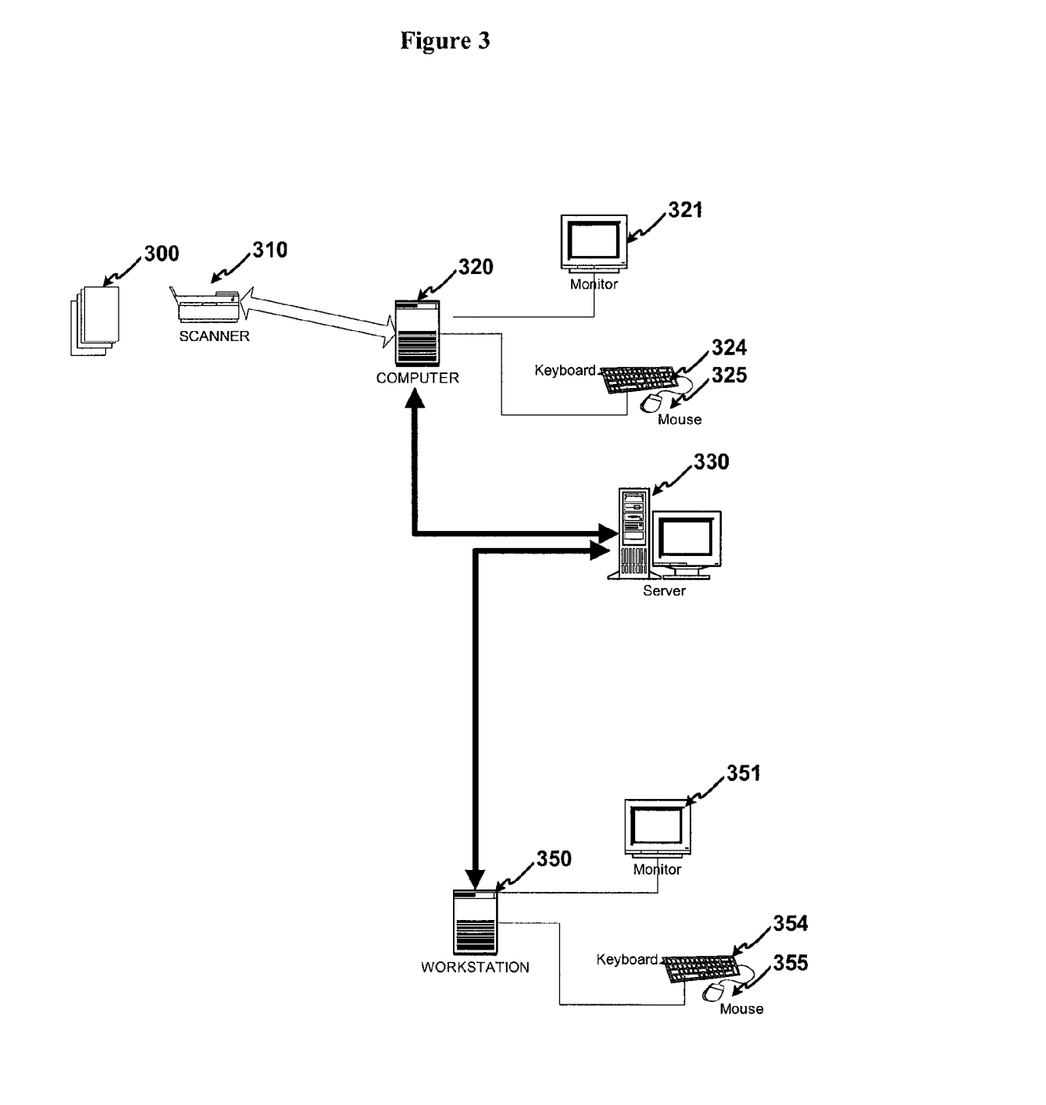
FIG. 3 shows a typical networked system for implementing aspects of the present invention.

FIG. 3 shows a networked system suitable for an embodiment of the invention. A major function of the networked computer system is to provide all of the images needed to build the composite image to be displayed. In general, the captured student images will be unique to each document, but the other layers will often be fixed for all instances of each item.

To capture the digitized image of a student's response, the appropriate assessment document (300) is scanned by an image scanner (310), which, in turn, is attached to a computer (320). The captured digitized image of the student response is stored within a file system of the computer or transmitted to another computer shown here as a server (330). During scanning, the operator can interact with the scanning process using a computer monitor (321), keyboard (324) and mouse (325) in addition to the scanner itself.

The remaining images for the different layers will generally be created through other means and may be stored on the server (330) and/or pre-loaded into the reader's workstation (350). Such layers can be created manually using image creation software, can be created directly from a digitized representation of the assessment document such as would be used to create the document, or other means that will be obvious to one skilled in the art of creating images.

Once all of the images are available, the composite image can be created, typically within the workstation (350) although the composite image could be created on some other system such as the server (330).

Once the composite image is available, it can be displayed on the reader's monitor (351). Once displayed, the reader can assign a score to the displayed constructed response using a keyboard (354), mouse (355), or other appropriate control device. Alternatively, the reader can utilize a manipulation tool through the use of the keyboard, mouse, or other appropriate control device, to change the selection of displayed layers, change the colors of displayed colors, or other manipulations. Such other manipulations may include rotation of the displayed image, selection of a region of interest within the displayed image, or changing the zoom factor (alternatively known as the display factor) of the displayed image. Within such manipulations, changes in contrast, or brightness are achieved by manipulating the display colors so that none of the manipulations require changing the underlying image.

Figure 4:
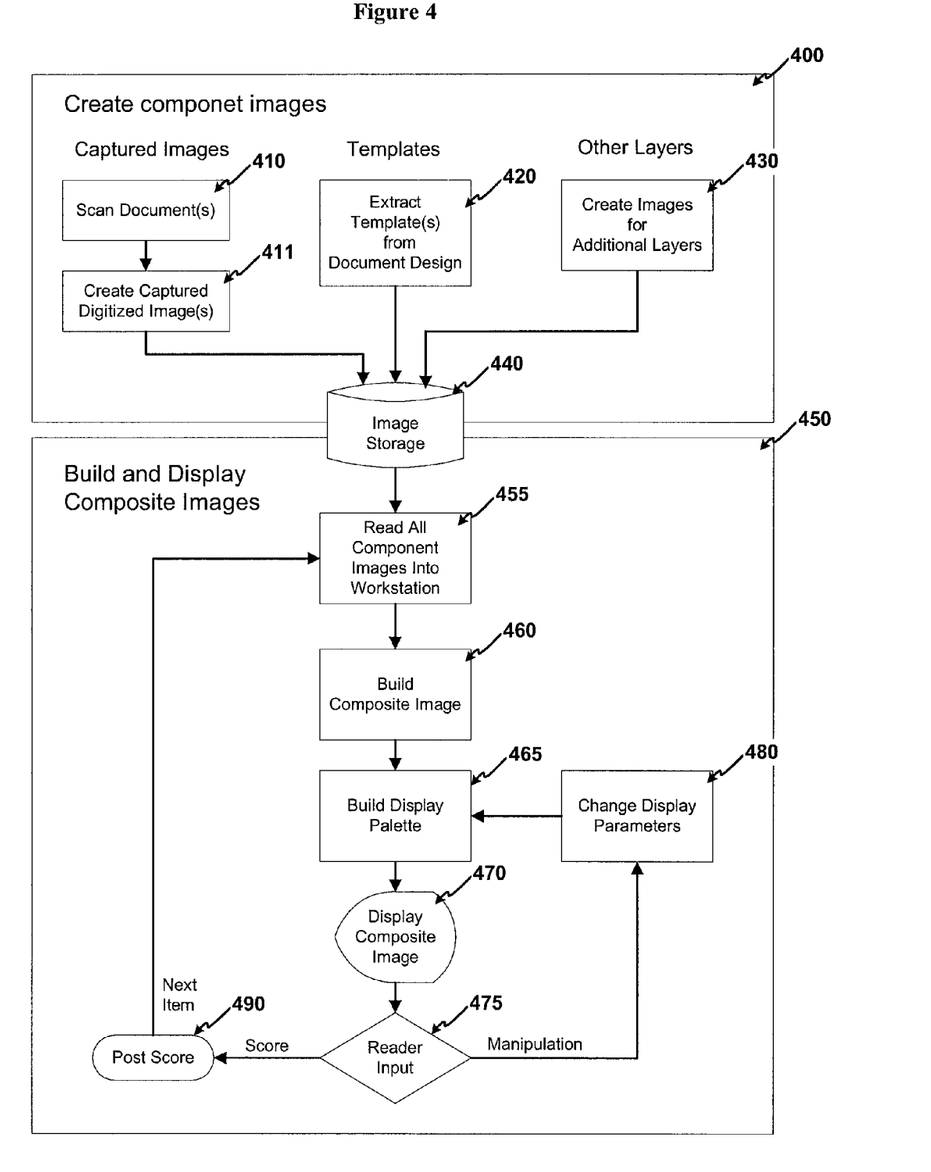
FIG. 4 shows a typical high-level block diagram of a process embodying aspects of the present invention.

FIG. 4 shows a block diagram of one embodiment of the invention. In this embodiment, there are two distinct phases, the "pre-work" phase (400) in which all of the needed images are created for each of the layers, and the "working" phase (450) in which the composite images are built and displayed to a reader.

In the pre-work phase, the digitized representations of the constructed responses are created by first scanning assessment documents (410) and then creating the captured images from the scanning process (411). In some instances, the image captured by the scanner will be sufficient while in others, additional processing will be needed to convert the scanned image to the needed digitized representation of the student response. Such additional processing may involve extraction of student marks from a color image, selection of a region of interest, adjustment of the horizontal and/or vertical position of the image, adjustment of the horizontal and/or vertical stretch of the image, rotation of the image to adjust for skew, push-to white of very light marks, push to black of dark marks, normalization of the image colors or grayscale values, and/or other manipulations. Examples of such processing are described in Poor, U.S. Published Patent Application No. 2004-0126036 and Poor, U.S. Provisional Application No. 60/945,165, the respective disclosures of which are hereby incorporated by reference.

Additionally, in the pre-work phase, additional images are created for the other layers. Typically, such additional layers are static: for each item, there is one image for each additional layer and that one image will be used for all instances of that item, i.e., for all constructed responses to that item.

In the context of scoring a constructed response item, there is typically a "template" (420) which shows the pre-printed information on the form. Such a template can be created by scanning a blank form such that the pre-printed information is visible. If infra-red light is normally used for document scanning, the form can be scanned with visual spectrum light, as taught by McMillin (U.S. Pat. No. 5,103,490) (McMillin '490)—the disclosure of which is hereby incorporated by reference—to create the template. Preferably, however, the template can be created programmatically from a digital representation of the assessment document such as might be used to produce the printed documents.

Additional layers may be used and the methods of creating appropriate images (430) may vary. For example, if a layer is designed to be a "hint", the hint layer may be created by scanning a document which has the markings for the hint instead of a student constructed response. Alternatively, a hint can be created at the same time the document is designed. In this scenario, the hint context will not be exported as part of the printing or the template creation, but will be exported separately to create the hint image. Hint layers may also be directly created with graphic creation programs or even with word processing programs and then converted or "printed" to an image file. Similar processing options exist for many other potential layers such as mask layers and rubric layers.

All images created in the pre-processing need to be saved in some digital form. In FIG. 4, there is a common repository for all images (440), but other strategies may be used.

The second phase of FIG. 4 shows how the images are used in the working phase (450), first by combining a subset of images into a layered composite image and then by displaying the composite image with appropriate display parameters to control which layers are displayed. In the first part of the process (455), the appropriate digitized image of a constructed response is selected and read into the workstation memory. The images for the other layers that may be needed by the reader in order to properly score the item are also needed in memory. In one embodiment, all of the extra layer images are pre-loaded onto the workstation. In another, each needed image is read in from an appropriate repository as needed. In yet a third, images for additional layers that are needed are cached on the workstation after their first use so that they do not need to be retrieved when needed for another instance of a student constructed response for the same item.

Once all of the needed images are in the workstation, they are combined in step (460) into a single composite image. Specific bits within the pixels from each layer are assigned to specific bits within the composite image such that each bit location within the composite image corresponds to a specific layer.

Once the composite image is created, it can be displayed to the reader. In the process shown in FIG. 4, the display occurs immediately after the composite image is created. In a more productive embodiment, at least two composite images will be maintained so that the next composite image is ready as soon as the reader completes working on the currently displayed image.

Figures 5, 5A:
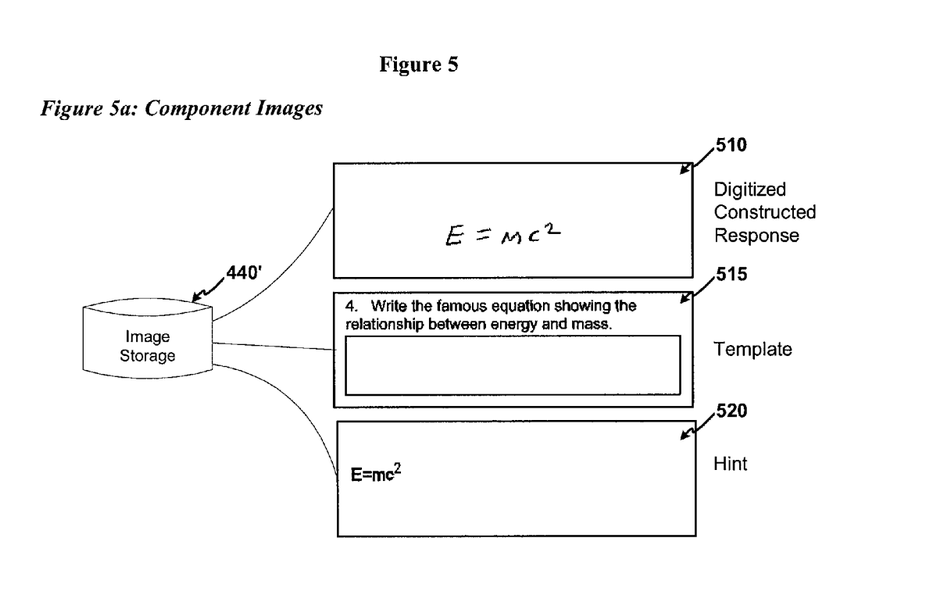
FIG. 5a schematically shows the storage of data comprising component layers, including the constructed response, the template, and the hint, which can be combined into a composite image.
Figure 6:
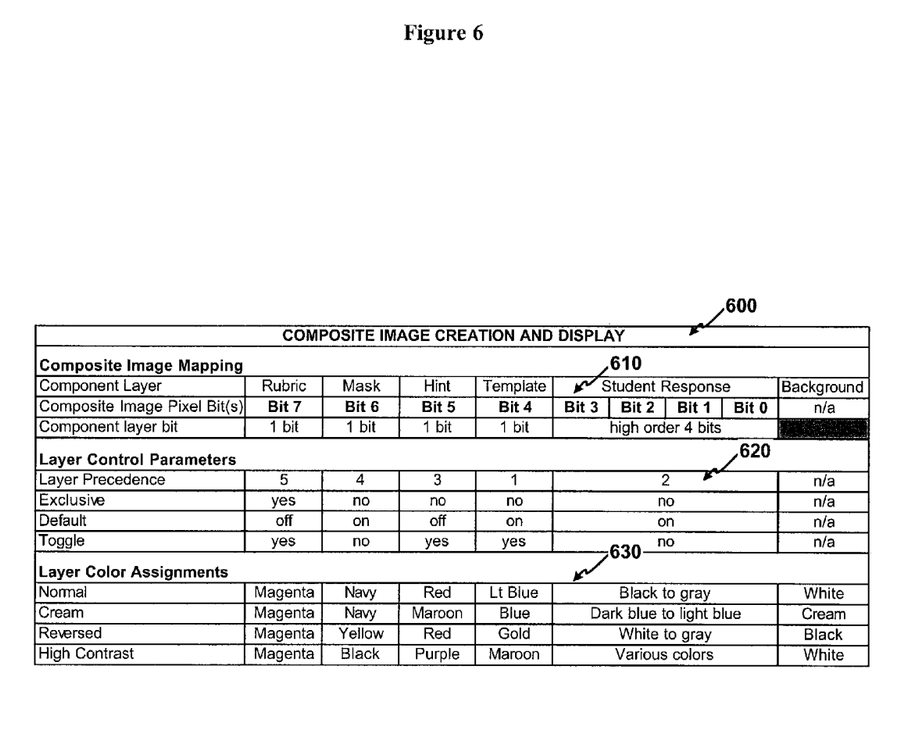
FIG. 6 shows a series of color palettes used to selectively display the layers in the 4-bit image

The display of the image will depend on specific display parameters, and default or initial values will be established before the first display of any composite image. Such display parameters may include information such as region of interest, zooming factors, and the like, but will also include layer selection and color selection parameters. From these parameters, a custom palette of colors will be created (465) such that there is a color to be displayed for each possible bit pattern within the composite image. Then the composite image can be displayed (470) on an appropriate computer monitor or other display device using the color palette to determine the color used to display each pixel within the area of the composite image that is shown. There are many possible mappings of layers into specific pixels of a composite image. Two such mappings are shown in FIGS. 5 and 6, but it should be clear to one skilled in the art that such mappings are possible for a wide variety of bitmapped image storage formats.

Typically, a reader will respond to a displayed composite image in one of two ways. Either the reader will be able to make an appropriate determination based on the displayed information, or the reader will need to adjust the display to reveal different information. In either case, the reader will typically provide some sort of input (475) using a device such as a keyboard, mouse, touch screen, or voice command.

If the reader input provides the score determination or other appropriate disposition of the item being displayed, the determined score is stored (490) and the process continues if there are additional items to be displayed.

On the other hand, if the reader requires additional or different information in order to be able to make the determination, the input will typically be to do some manipulation of the image (475). Such manipulation may include one or more of several manipulation functions including, but not limited to, selection of a subset of the displayed image, changing the layers that are displayed, rotating the image, flipping (mirror) of the image along the vertical center line, flipping of the image along the horizontal center line, changing the contrast or brightness of one or more layers, changing the set of colors used to display the different layers, changing the color used for the background, changing the set of colors used to display a specific layer, changing the zoom level of the image, changing the display characteristics within a selected area, or switching from whole image display to a region of interest. For all of the above manipulations except rotation, the manipulations can be achieved without altering the underlying composite image, most of the manipulations are, in fact, implemented by merely changing the color palette.

To suppress a layer, the palette is built by ignoring the bit(s) associated with the layer to be suppressed. For example, consider an example for which there are only two layers, the student response and a "template" containing background context. To show both the template and the student response, pixels with student responses (with or without the template at the same location) are set to the appropriate student response color. Pixels with the template and without the student response are set to the template color. All other pixels are set to the background color. To suppress the template, the pixels with the template and without the student response are set to the background color. In practice, however, only the colors in the color palette are set as these colors map to the appropriate pixels within the image.

To manipulate the priority of the layers the color palette is also used. Each entry in the color palette corresponds to a combination or none or more layers. For each entry, the entry is initially set to the background color and then the layers are examined in reverse priority. For each layer, if the entry contains the bit(s) associated with the layer and the layer is not suppressed, then the entry color is set to the appropriate layer color, thereby overriding any prior color. When the color palette is applied to the image, higher priority layers will appear "above" lower priority layers.

Additional image description parameters should include the horizontal direction for rendering (left to right or right to left), the vertical direction for rendering (top to bottom or bottom to top). By changing the values of these two parameters, the rendered image can be manipulated (a) to show a "mirror" image (change the horizontal direction), (b) to "flip" the image upside-down (change the vertical direction), or (c) rotate the image 180° (change both). Once again, none of these manipulations require changing the underlying image as these effects can be achieved through the description of the image and the use of a robust image display routine. Especially when dealing with duplex scanned images, in some images the pixels are arrayed from left to right while in others the pixels are arrayed from right to left. A robust display routine can support either. Similarly, in some images formats, the "lines" of the image are stored from top to bottom, while in others the lines are stored from the bottom to the top. Once again, a robust display routine can support either. Therefore, by merely changing the horizontal direction (left to right and right to left), the displayed image will be a mirror image without any manipulation of the underlying image. Similarly, by changing the vertical direction (top to bottom and bottom to top), the displayed image will be "flipped". By simultaneously changing both, the displayed image will be both a mirror image and flipped which is equivalent to rotating the image 180°, once again without changing the underlying image.

An important set of image description parameters describes the "region of interest" (ROI) or the extent of the image to be displayed. This ROI may include some or all of the image. Once again, if a robust display routine is used, the parameters describing the area of the image can be changed without modifying the underlying image. If the display area is fixed, setting a small area of the total image to display will effectively "zoom in" to the specified area or ROI. By manipulating the ROI parameters, the user can effectively change the zoom level of the displayed image or the extent of the displayed image without changing the underlying image that is being displayed.

For special manipulations, such as rotation, a temporary derivative image based on the underlying image needs to be created with the appropriate manipulation applied. Typically, image display routines utilize the lines and pixels (or columns) as defined within the stored image so temporary derivative images are required whenever the pixels in a displayed row are not all from the same row of the underlying image or whenever the pixels in a displayed column are not all from the same underlying image. To rotate an image 90°, for example, the rows and columns must be redefined and an intermediate image must be created with the pixels reassigned to the new rows and the new columns.

Display parameters may contain a variety of parameters to support different manipulations including, but not limited to, the region of the composite image to be displayed, the horizontal direction of the image to be displayed (left to right or right to left), the vertical direction of the image to be displayed (top to bottom or bottom to top), the layers to be visible, the color or color set for each layer including the background, and the zoom level.

Using the display parameters, the changes in the display of layers, colors, contrast, brightness, background, are all achieved by merely altering the appropriate entries within the custom color palette. The changing of the entries in the custom color palette achieves results equivalent to building a color image one layer at a time but without the computationally intensive "conceptual" processing that follows. The equivalent conceptual process starts by first creating a new image area setting all pixels to the background color. Then, the layers are each processed, one at a time. For each layer, each pixel is examined: if a pixel within the layer is ON, the corresponding pixel in the new image area is set to the selected color for that layer. Once this conceptual processing is complete for all layers and all pixels, then resulting composite image will show all of the layers with the last processed layer taking precedence. Layers can be made to appear "over" or "under" each other by changing the sequence in which the different layers are processed. Layers can be "hidden" by not changing any pixels. Colors of layers can be changed by changing the colors assigned to the layers before the processing begins.

These same effects are achieved through the use of the custom color palettes. Each entry in the custom color set corresponds to a particular bit pattern and each bit pattern corresponds to the presence or absence of each layer. For each bit pattern, a color is assigned to show the highest priority displayed layer. If none of the "ON" bits within the pattern correspond to a displayed layer, the color entry is set to the background color. If the "ON" bits represent one or more displayed layers, the color entry is set to the color corresponding to the highest priority layer within the set represented by the "ON" bits. Once the parameters are set (480) a new palette will be created if needed (465), and the image can be redisplayed (470). Because setting the parameters and building a new color palette are both extremely quick in computational terms, this method of performing manipulations with color palette changes yields an almost "instant" change and thereby significantly improves performance.

FIG. 5 shows one embodiment of the invention using three layers such that each layer comprises a bitonal (black and white) 1-bit image and a 4-bit per pixel composite image. FIG. 5*a* shows the three images (510, 515, 520) which are the component parts (i.e., layers) of the composite image and are stored in the Image Storage (440). The three images consist of, respectively, the digitized representation of a single student's response (510), the template or mask for the item (515), and a "hint" showing the correct answer (520).

Figure 5B:
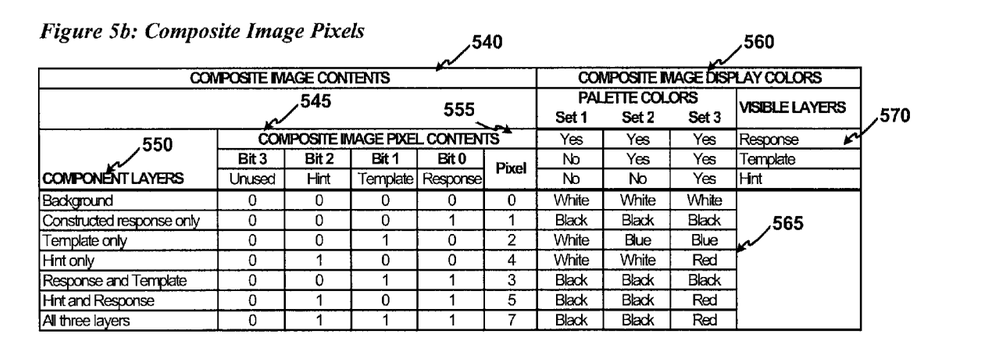
FIG. 5b is a table showing an embodiment of the invention utilizing four layers—background, constructed response, template, and hint—to create a 4-bit composite image.

FIG. 5b shows how the pixels within the composite image can be created from the component images (on the left, 540), and then how the pixels within the composite image are mapped to different colors to create different displays for the reader (on the right, 560).

Since each component layer comprises only a single bit for each pixel, the composite image pixel can be created by allocating a single bit within each composite image as shown (545). More generally, however, each component layer is not necessarily limited to one bit per pixel, but has fewer bits per pixel than the composite image, and the sum of the bits per pixel of all component layers must be less than or equal to the number of bits per pixel of the composite image.

In FIG. 5b, the low order bit (bit 0) of each composite image pixel is set to "1" if the corresponding pixel within the digitized constructed response image (i.e., the response layer) is black, and to "0" if the corresponding pixel within the digitized constructed response image is white. In a similar manner, the next bit (bit 1) in each composite image pixel is set to "1" or "0" corresponding to the pixels in the template image (i.e., the template layer), and bit 2 in each in each composite image pixel is set to "1" or "0" corresponding to the pixels in the hint image (i.e., the hint layer). Note that bit 3 is unused and therefore always set to "0".

Using this strategy, the contents of each pixel within the composite image shows which component layers were white (0) or black (1). As shown in the first column (550), there are seven possible values from none of the component layers being black (i.e., the background) to all three being black yielding values in the composite pixels ranging from 0 through 7 (555). That is, the value of the pixel is the numeric value of the binary combinations of 1's and 0's of the bits.

Once the composite image has been built, an appropriate "color palette" can be constructed such as shown to the right (560). A color palette typically specifies a specific color for each possible pixel value (or bit pattern) of an image. In this example, there are seven possible values for a composite pixel (0, 1, 2, 3, 4, 5, or 7), and thus there are seven colors (not necessarily unique) within the color palette. Alternatively, there could be eight possible values for a composite pixel (0, 1, 2, 3, 4, 5, 6, or 7) and thus eight colors within the color palette if having only the hint and template layers ON—a pixel value of 6—were an option. In this example, there are three sets of values shown that can be used for the color palette (565). As shown at the top (570) each set (Set 1, Set 2, and Set 3) corresponds to which layers (Response, Template, or Hint) will or will not be visible within the display. For example, set 1 only displays non-background colors for pixels which are included within the student response. Set 2 displays non-background colors for pixels which are included within the student response or the template. And Set 3 displays non-background colors for pixels which are included within the student response, the template, or the hint. While it would be possible to have three colors, one for just the student response, one for just the template, and one for both, the colors are set so that pixels which are contained within the student response are all set to black, whether or not the corresponding pixels within the template are set, so that the student response appears to be "written over the template". In set 3, all three layers are included with the "hint" color taking precedence so that the hint appears "over" the other layers.

Figure 5C:
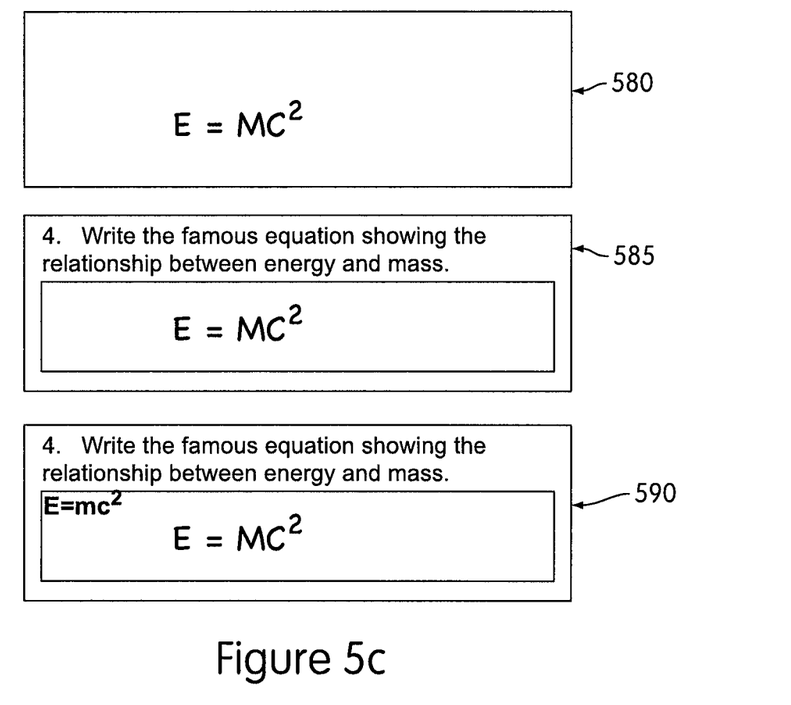
FIG. 5c shows three representations of a composite bit-mapped image, showing one, two, or three layers.
Figure 5D:
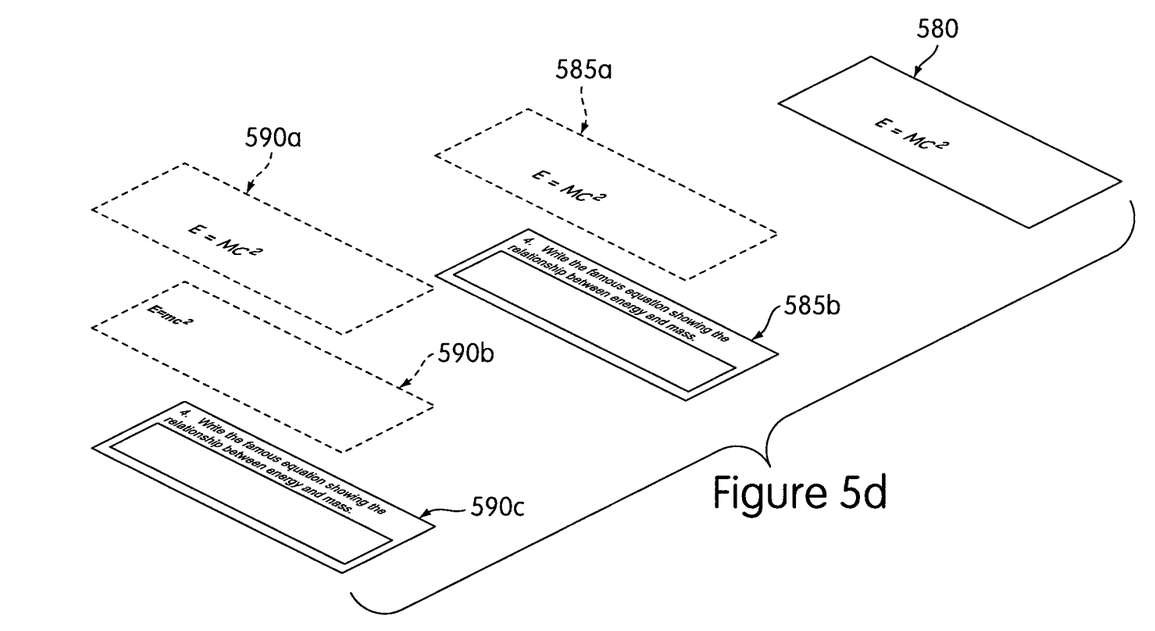
FIG. 5d shows the composite bit-mapped representations of FIG. 5c, with the layers shown separated from one another.

FIGS. 5c and 5d show the same composite image as it would be displayed by the three sets of colors for the color palette (580, 585, 590). That is, referring back to FIG. 5b, under (560), color set 1 corresponds to only the response being visible, color set 2 corresponds to the response and the template being visible, and color set 3 corresponds to the response, the template, and the hint being visible.

Image 580 in FIGS. 5c and 5d uses color set 1, which specifies that any pixel for which bit 0 (the response bit) is ON (i.e., "1") is visible, e.g., in black, and for all pixels in which bit 0 is not ON, those pixels are not visible, e.g., white. Accordingly, when color set 1 is specified for presentation of the composite image, only the response layer is visible.

Image 585 in FIG. 5c uses color set 2 from FIG. 5b, which specifies that any pixel for which bit 0 (the response bit) is ON (i.e., "1"), the color of that pixel is a visible color, e.g., black, for any pixel for which only bit 1 (the template bit) is ON, the color of that pixel is a visible color, preferably a different color than the non-zero response pixels, e.g., blue, and for all pixels in which neither bit 0 or bit 1 is ON, the color of that pixel is white. The response and template layers are shown separately in FIG. 5d, indicated by reference numbers 585a and 585b, respectively. Accordingly, when color set 2 is specified for presentation of the composite image, the response layer is visible and the template layer is visible, and the response and template layers are preferably different colors.

Image 590 in FIG. 5c uses color set 3 from FIG. 5b. Any pixel for which bit 2 (the hint bit) is ON is visible, e.g., in red. Any pixel for which only bit 1 (the template bit) is ON is visible and preferably a different color than the non-zero hint pixels, e.g., blue. Any pixel for which only bit 0 (the response bit) is ON or only bits 0 and 1 are ON is visible and preferably a different color than the non-zero hint and template pixels, e.g., black. And for all pixels in which neither bit 0, bit 1, or bit 2 is ON, the color of that pixel is white (i.e., background). The response, hint, and template layers are shown separately in FIG. 5d, indicated by reference numbers 590a, 590b, and 590c, respectively. Accordingly, when color set 3 is specified for presentation of the composite image, the response layer, the template layer, and the hint layer are visible and each is preferably a different color. Moreover, should any non-background portion of the hint layer overlap a non-background portion of the response layer and/or the template layer, the hint layer would show up on top of the response or template, preferably in a different color than the response or template. Various combinations of response, hint, template, and background colors can be used.

FIG. 6 shows a table (600) representing a more complex embodiment of the invention with five different layers: Rubric, Mask, Hint, Template, and Student Response. The first layer derives from a grayscale image representation of a student response, either from a 4-bit grayscale representation or from the first high order 4 bits (i.e., bits 0, 1, 2, 3) of an 8-bit grayscale representation. Each of the other four layers are 1-bit (bitonal) images. For purposes of explanation, it is assumed that 0 represents the absence of a mark.

As shown in FIG. 6, the five layers are combined into an 8-bit bitmapped image with each pixel within the composite image being derived from each of the five layers. The first section (610) of the table (600) in FIG. 6 shows the mapping of the component layers into the composite image. For the student response, the appropriate four bits from the digitized representation of the student response (i.e., the component, or constituent, image) are stored in bits 0-3 of the composite image. For each other layer, a single bit is set in each pixel of the composite image corresponding to the same pixel within the component layer image. That is, the bit of each Template constituent image pixel corresponds to bit 4 of the corresponding pixel of the composite image, the bit of each Hint constituent image pixel corresponds to bit 5 of the corresponding pixel of the composite image, the bit of each Mask constituent image pixel corresponds to bit 6 of the corresponding pixel of the composite image, and the bit of each Rubric constituent image pixel corresponds to bit 7 of the corresponding pixel of the composite image.

The second section (620) of the table (600) shows exemplary layer control parameters that may be used to build the appropriate color palette. In the illustrated embodiment, the control parameters are: Layer Precedence, Exclusive, Default, and Toggle (each of which will be described below). While there are many other parameters that might be used within a specific embodiment, many layer parameters will be similar to those shown:

Layer Precedence: In the embodiment shown, colors from multiple layers at a given pixel are not blended, but a single color is selected for each pixel. When there are two or more layers present at a single pixel (i.e., the bits corresponding to two or more layers, or constituent images, are ON), the layer precedence parameter is used to select which color is to be displayed, with the selected color being from the layer with the highest precedence.

Exclusive: Normally multiple layers can be displayed at one time. The Exclusive parameter indicates when a specific layer's display effectively suppresses the display of all other layers. In the example, when the Rubric is shown (i.e., bit 7 of the composite image is ON), it is the only layer shown, regardless of which other layers may also be ON.

Default: The default parameter sets the initial value for the layers to be displayed when a new composite item is first shown. The default may be static or dynamically adjusted according to the item, the user, and/or the activities during the current and/or prior sessions. For example, a specific layer may initially be set to always be ON for a new image, but the user may change the default so that, in subsequent images, that same layer is OFF.

Toggle: The toggle parameter determines whether or not the user will be able to change the display setting for a given layer. In the current example, the user will not be able to turn off the mask or the student response layers.

The third section (630) of table (600) shows the color values assigned to each layer for four different sets of color values: Normal, Cream, Reversed, High Contrast. When there is no displayed layer at a specific pixel, the pixel will be shown in the background color, white, cream, black, or white, depending on the color set. When there is one or more displayed layers at a specific pixel, the color selected will be the color corresponding to the displayed layer with the highest precedence value. If the color is selected from the student response layer, the color will be a function of the 4 bits of information within the composite image (values of 1-15).

Figures 7, 7A:
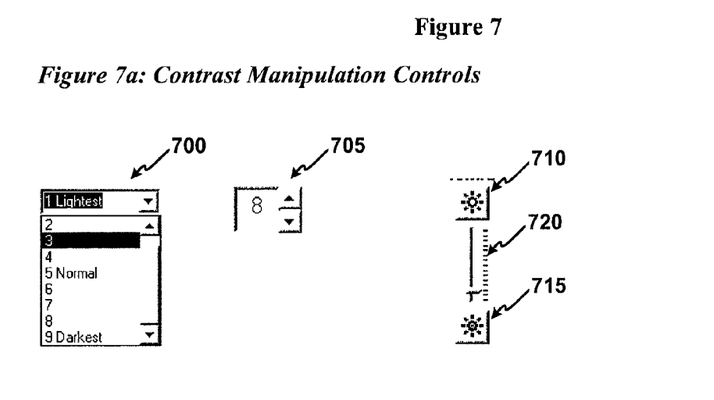
FIG. 7 shows an alternate series of color palettes used to selectively display the layers in the 4-bit image

While it would be possible to assign a fixed color value for each of the fifteen non-zero values of the 4-bits, a better embodiment is to have flexible color values that depend on a "contrast" or "darkness" manipulation control as shown in FIG. 7. Such a control may be dependent on audio input, keyboard entry, mouse movement or other input. For controls displayed on a computer screen appropriate controls include, but are not limited to, a "pull down" set of choices (700), a numerical value (705), up and down controls (710, 715) or a "slider" (720) as shown in FIG. 7a. In the example in FIG. 7a, there are nine possible values for the contrast control, but the number of possible selections may be more or less.

Using such a control, different sets of colors can be selected for the seven values represented by the four bits within the composite image corresponding to each pixel's component from the digitized representation of the student response. In the representative table (730) of FIG. 7b, values are shown in grayscale from white (255) to black (0). Since most color palettes utilize values for three components (Red, Blue, and Green), the single value in the table is applied to each component color. The values shown cover nine separate user-controlled contrast settings. The first setting is for the lightest contrast such that the darkest marks are shown as black while all other pixel levels are set to white. In the middle (contrast setting 5), there is a set of discrete levels such that very light marks appear close to white while very dark marks appear black and all marks between are scaled from light to dark.

Figure 7B:
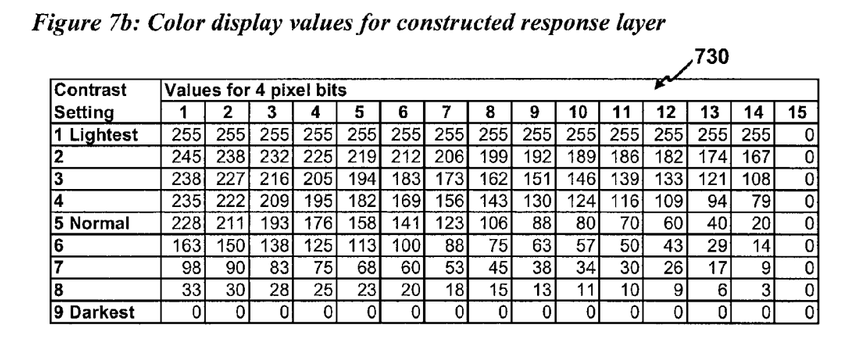

While the table in FIG. 7b only presents a single color value for each cell, a similar process can be utilized to provide red, blue, and green values for each cell in the table and thereby provide a totally flexible set of colors. Even with the simple grayscale values in the table, however, the user can compensate for light marks by selecting a dark presentation so that even light marks are easy to read. In a similar manner, the user can compensate for smudges and erasures by selecting a light presentation so that the lighter marks are close to zero. Other possible sets of color values can also be created such as to emphasize light marks, emphasize medium marks, white out all marks below a threshold, or to implement other desirable display settings.

Figure 8A:
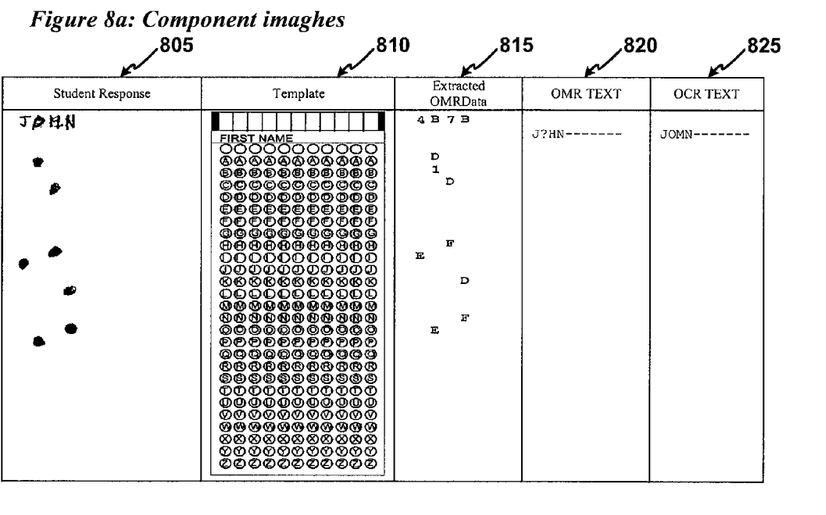
FIG. 8 shows an embodiment utilizing 5 layers to create an 8-bit composite image
Figure 8B:
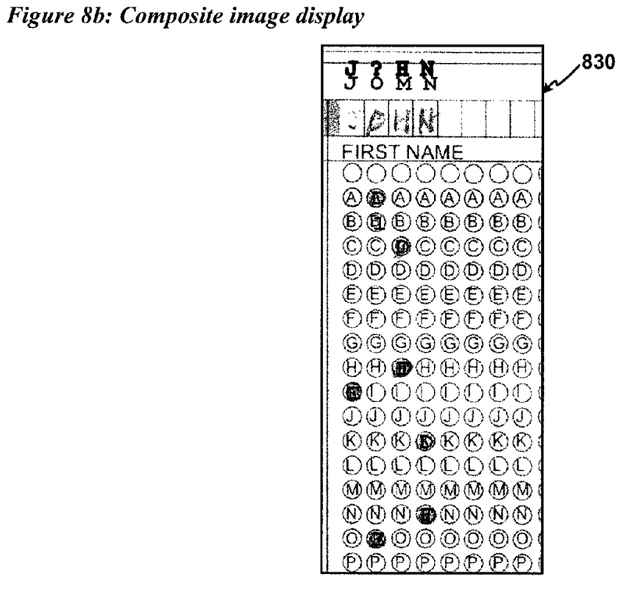

In the examples above (FIGS. 5-7), there is a single layer derived from the captured image (i.e., the student response layer) and all other layers are static across all instances of the particular item. There are numerous applications of the invention, however, in which multiple layers may be derived from the scanned data. FIG. 8 shows one such implementation in which a demographic field from a scanned document is shown. In addition to the template (810) (fixed over all instances), this particular embodiment includes several different layers, all of which derive from the scanned data. The first is the actual scanned marks (805), in this case letters and marks in Optical Mark Reading (OMR) targets. The second derived layer presents the darkness or "goodness of mark" for each OMR position (815). The third derived layer presents the text character extracted for each column within the matrix (820). The fourth layer presents the text character extracted for each handwritten character based on Optical Character Recognition or Image Character Recognition (OCR or ICR) (825). The composite image with all layers shown is presented in FIG. 8b (830), and each layer can be displayed in a different color.

In instances where computational cycles and human productivity are relatively small components of the total cost, this invention may have little to offer over more conventional techniques in which multiple images are displayed in the same area. However, in instances where there is limited bandwidth to get images to the workstations, or where the costs of the readers or clerks accounts for a significant amount of the cost of processing, this invention offers a computationally efficient and responsive method to selectively present information from multiple constituent images.

It should be clear to anyone skilled in the art that there are multiple bitmapped image storage formats to which this invention can be applied. Also, there are multiple types of data other than mere darkness than can be advantageously included in the composite image, such as sequence or time data as shown in commonly-owned co-pending U.S. Patent Application Publication No 2006-0120605 to Poor, the disclosure of which is hereby incorporated by reference. There are also many applications other than scoring of assessment items for which this patent may advantageously be used to present important information to viewers, whether or not the viewer has the option to manipulate the displayed image. One application might include superimposing geographic, political, weather or other information over satellite images. Another application might be in the context of engineering or architectural drawings with multiple layers such as concrete, electrical, water, and furniture.

The invention claimed is:

1. A method for creating a composite digital image of information printed or written on a page, the composite digital image including a plurality of pixels and each pixel including two or more bits, said method comprising:

designating different portions of the information on the page as different layers;

storing two or more constituent images, each constituent image comprising a digital image of one of the different layers, each constituent image including a number of pixels that is the same as the number of pixels in the composite digital image, each pixel of the constituent image including a number of bits that is less than the number of bits per pixel of the composite digital image;

associating each bit of each constituent image with at least one specified bit of each pixel of the composite digital image to define a bit pattern for each pixel of the composite digital image;

defining at least two color sets by associating a color with each possible bit pattern of the pixels of the composite digital image, whereby the colors associated with the possible bit patterns for each color set will determine which of the different layers will be visible and the color of each visible layer for the given color set; and displaying one or more of the different layers by selecting the color set corresponding to the layers to be displayed and displaying each pixel of the composite digital image in the color associated with the bit pattern of that pixel for the selected color set, wherein the page is an assessment document, and said method comprises designating at least a layer comprising a student response.

2. The method of claim 1, wherein the student response includes one or more of: demographic information, responses to selected response items, and responses to constructed response items.

3. The method of claim 1, further comprising the step of generating a digital image of each layer, wherein the generating step comprises scanning a document having the layer information on it or creating the digital image programmatically from a digital representation of the layer data.

4. The method of claim 1, wherein the composite bit-mapped image has four or eight bits per pixel.

5. The method of claim 1, wherein defining the color sets comprises:

determining the highest priority layer and assigning a color to the highest priority layer;

if none of the ON bits within the bit pattern of a pixel correspond to a displayed layer, setting the color for that bit pattern to a background color; and if the ON bits within the bit pattern of a pixel correspond to one or more displayed layers, setting the color for that bit pattern to the color assigned to the highest priority layer.

6. The method of claim 1, wherein the associating step further comprises:

setting the value of each bit of each composite image pixel to 1 or 0 in accordance with whether the value of the associated bit of the constituent image pixel is 1 or 0;

determining a value of each composite image pixel from the binary combination of the 1's and 0's of the bits of the composite image pixel; and associating a color for each color set with each possible value of the composite image pixels, and wherein the displaying step comprises, for each composite image pixel, displaying the color associated with the value of that pixel for the selected color set.

7. The method of claim 1, further comprising enabling a user to control the darkness or contrast of one or more displayed layers.

8. The method of claim 1, wherein at least one layer is static and does not change from one composite digital image to the next, and at least one layer is dynamic and changes from one composite digital image to the next.

9. The method of claim 1, further comprising manipulating the composite digital image, the manipulation comprising one or more of:

selection of a subset of the displayed image,
changing the layers that are displayed,
rotating the image,
flipping (mirror) of the image along the vertical center line,
flipping of the image along the horizontal center line,
changing the contrast or brightness of one or more layers,
changing the set of colors used to display the different layers,
changing the color used for the background,
changing the set of colors used to display a specific layer,
changing the zoom level of the image,
changing the display characteristics within a selected area, or
switching from whole image display to a region of interest.

10. The method of claim 1, wherein at least one constituent image comprises multiple bits per pixel which are associated with multiple bits of each pixel of the composite digital image.

11. The method of claim 1, further comprising defining layer control parameters for each layer, said layer control parameters comprising one or more of:

a layer precedence parameter which controls which layer to display when two or more layers are present in a pixel,
a layer exclusiveness parameter which specifies that a layer's display effectively suppresses the display of all other layers,
a layer default parameter which sets the initial value for the layers to be displayed when a new composite digital image is first shown, and
a layer toggle parameter, which determines whether or not a user will be able to change a display setting for a given layer.

12. The method of claim 1, wherein said method further comprises designating a second layer comprising a document template which includes instructional text and response areas.

13. The method of claim 1, wherein said method further comprises designating a second layer comprising a hint providing a reader of the assessment document with information relating to the scoring of a student response with which the hint is associated.

14. The method of claim 1, wherein said method further comprises designating a second layer comprising a document template which includes instructional text and response areas and a third layer comprising a hint providing a reader of the assessment document with information relating to the scoring of a student response with which the hint is associated.

15. The method of claim 1, wherein colors are associated with the possible bit patterns such that each different layer is displayed in a different color.

* * * * *